Figure 1:
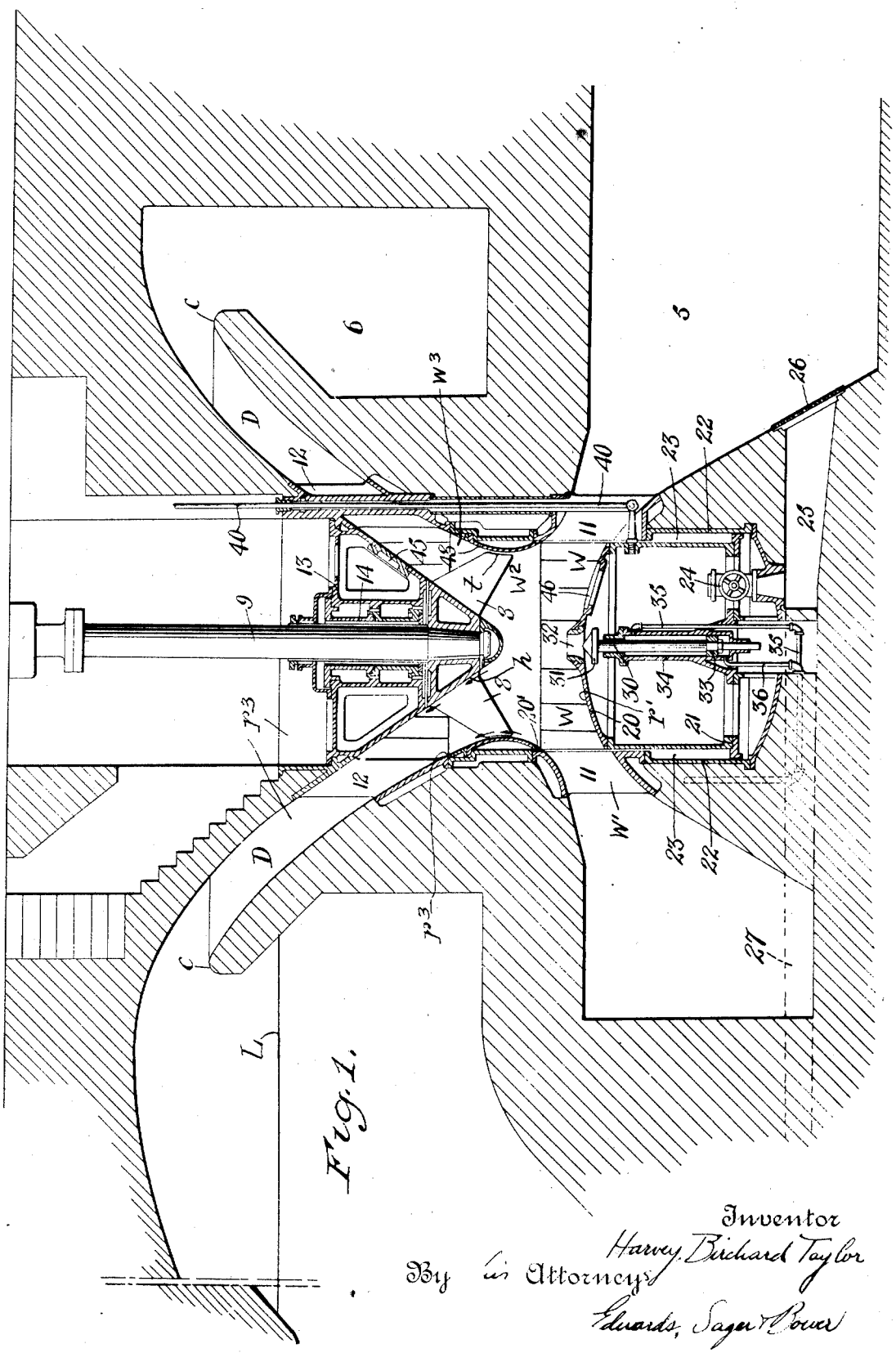

March 5, 1929.  H. B. TAYLOR  1,704,375
HYDRAULIC TURBINE
Filed April 23, 1920  3 Sheets-Sheet 1

Inventor
Harvey Birchard Taylor
By his Attorneys
Edwards, Sager & Bower

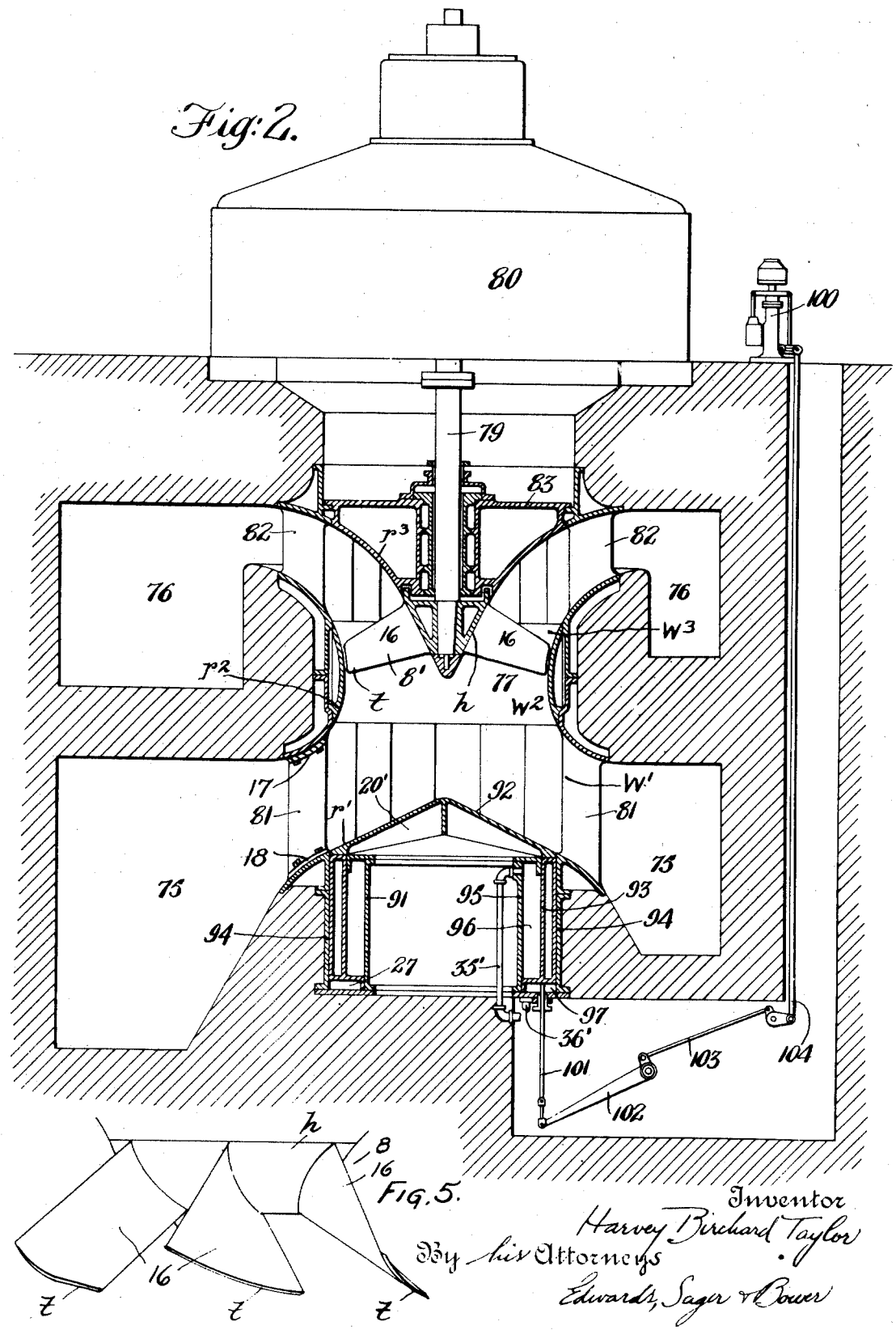

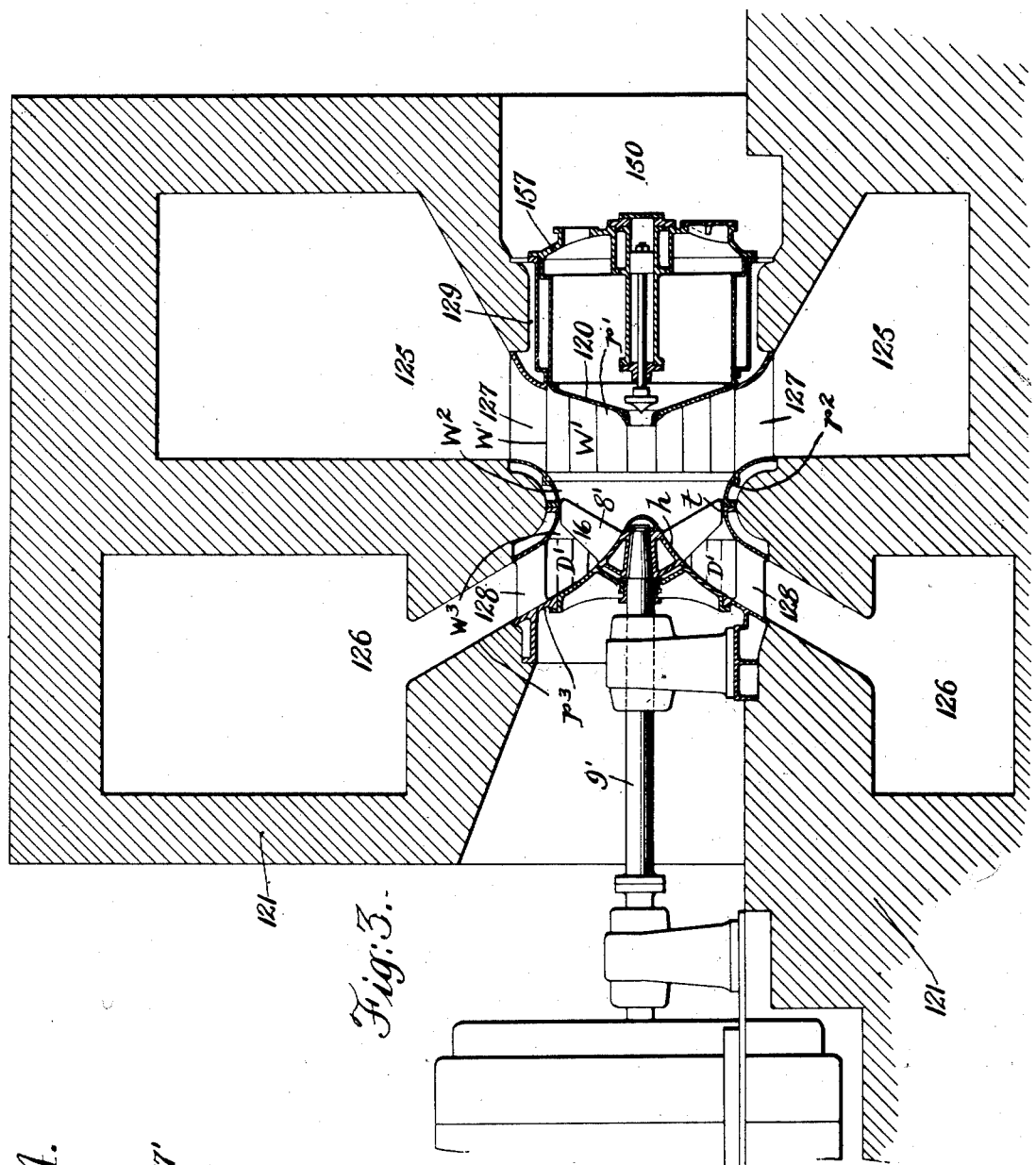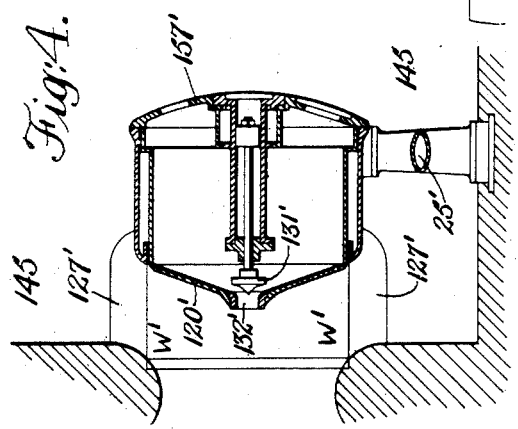

Patented Mar. 5, 1929.

1,704,375

UNITED STATES PATENT OFFICE.

HARVEY BIRCHARD TAYLOR, OF PHILADELPHIA, PENNSYLVANIA.

HYDRAULIC TURBINE.

Application filed April 23, 1920. Serial No. 375,930.

This invention relates to hydraulic turbines and particularly to the installation of the turbine parts in a power house. The chief object of the invention is to provide a turbine in which a runner, preferably of high specific speed, is positioned in a water passage formed to have its flow controlled by simple and rugged control means such as a movable plunger gate.

Another object of the invention is to provide such a turbine in which the parts will have great mechanical simplicity and strength of structure and be readily accessible for replacement and repair. Further objects of the invention will appear from the following description taken in connection with the accompanying drawings, in which Fig. 1 is a vertical sectional elevation, Figs. 2, 3 and 4 are vertical sectional views of modifications, and Fig. 5 is a detached view of a preferred form of runner.

In the embodiment of the invention illustrated in Fig. 1 a power house substructure contains the intake passage 5 and discharge passage 6 connected by the water passage W and the annular draft tube D. The conduit or water passage W at entrance is directed inward at the portion W' and turns into the axial direction at the axial flow portion $W^2$ and continues on smoothly curving lines in the diagonally outward flow portion $W^3$ to meet the outwardly expanding draft tube D, delivering the discharge into the outlet 6. Within the water passage W, and preferably in the outwardly curving portion $W^3$ thereof, is placed the turbine runner 8, with its blades extending directly across the flow lines so that the blades are diagonal to the runner axis and the flow through the runner is diagonally outward away from said axis, the term "diagonal" meaning at an angle of less than 90°. The water passage W and draft tube D thus form a continuous passage of generally annular form at first converging to the throat portion $W^2$ and then diverging therefrom. The surfaces of these passages are formed at the outside by the continuous surface of revolution $r^2$ provided by the upper exposed surface of the stay vane ring 11, the inner surface of the casing ring 48 and the lower exposed surface of the stay vane ring 12 and the continuation thereof formed by the outer surface of the draft tube D. The inner surfaces of these passages are formed by the lower exposed surface of the stay vane ring 11, the conical end surface $r^1$ of the plunger gate 20 and by the conical surface of revolution $r^3$ formed by the exposed surfaces of the runner hub $h$, cover casting 13, the upper exposed surface of the stay vane ring 12 and the continuation thereof formed by the inner surface of the draft tube D.

The intake and discharge are provided with vane rings 11 and 12, respectively, preferably vertically one above the other and forming with the foundation a continuous columnar support resting on the power house foundations and sustaining the power house structure above. The runner 8 has a cover casting 13 resting on vane ring 12 and carrying a central bearing 14 for the runner shaft 9.

The flow entering by intake 5 passes upwardly through conduit W and runner 8 and out through the draft tube D and discharge passage 6. The relation between intake W', runner 8 and draft tube D is such that a straight line X may pass therethrough as shown in Fig. 1. To control the flow a gate 20 in form of a plunger is provided with an end surface of revolution $r^1$ below the runner and moves vertically just within the inner edges of entrance guide vanes 11 to vary the entrance area. The plunger gate 20 has a piston flange 21 moving in cylinder 22 and providing an annular space 23 between the cylinder and plunger. The plunger is moved upward by hydraulic pressure admitted below it through an adjustable valve 24 from a passage 25 connecting with the intake 5. The entrance of this passage is protected by a screen 26 to keep out trash and there is also provided a continuation 27 of the passage 25 leading to a waste valve which may be opened whenever necessary, to allow water to flow through freely and sweep out any sediment which might collect.

The valve 24 is adjusted to a certain desired opening and left at that adjustment and the movement of the plunger gate 20 is controlled by the movement of the fluid pressure operated piston 30 at the center of the plunger. This piston 30 carries the valve 31 adapted to close the port 32 at the nose of the plunger gate, and at the other end of the piston is the head 33 working in cylinder 34 and moved by fluid pressure controlled by the turbine governor or other controlling means at any convenient point in the power house through the opening pipe 35 and the closing pipe 36.

To move the plunger gate toward closed position pressure is admitted through pipe 36 and exhausted through pipe 35 to raise the piston 30 and close pilot valve 31 under port 32. Pressure through passage 25 and valve 24 will then build up under the plunger gate 20 and will be resisted only by the weight of the plunger, the pressure in space 23 and the pressure on the top of the plunger which due to the higher velocity of flow at this point is considerably reduced.

The plunger gate 20 therefore moves upward and will continue this upward movement so long as the port 32 is closed by valve 31, and will be arrested at any point by opening of the valve 31. The plunger 20 will therefore place itself in position corresponding to that of the piston 30 and automatically maintain itself there, for further upward movement will open the port 32 to reduce the closing pressure and with port 32 closed or restricted the pressure beneath the plunger will hold it against opening.

To open the plunger 20, pressure is admitted through pipe 35 and exhausted through pipe 36, lowering piston 30 and opening port 32 and thus releasing the pressure under the plunger, since the valve 24 will have previously been set so that the outflow through open port 32 will exceed the inflow through valve 24. Then the weight of the plunger and the pressure in space 23, connected to the intake, will move the plunger downward toward open position. And the plunger may be stopped in any intermediate position by stopping the downward movement of the piston 30. The position of the plunger gate 20 will thus be automatically regulated by the position of the pilot piston 30 and in practice the plunger gate may be kept floating above its fully open position and made responsive to changes in load by suitable governing means controlling the position of the piston 30 through pipes 35 and 36. In order that the governor valves or other controlling means may have the proper compensating motion a rod, 40, is connected to the restoring mechanism of the governor or other control. This rod 40 is arranged in line with the casing stay vanes 11 and 12, and placed in recesses in the vanes so that it does not interfere with the flow and is protected from ice or trash carried by the water.

The turbine can be dismantled by removing the runner, 8, upward if the turbine head cover 13 is first taken off but without disturbing any other parts of the turbine. This can, if desired, be done with the head gates open and the plunger, 20, automatically held in the closed position by the piston valve 30, and casing pressure. If the plunger is to be withdrawn for repairs, the head gates would be closed, the head cover 13 and the shaft and runner removed, and the manhole, 46, opened in the plunger 20. The lower flange 21, would then be detached from the plunger. The stationary ring 48, surrounding the runner would then be unbolted and removed upward, leaving sufficient space for the plunger to be hoisted out. In the case of large units, it will be possible to inspect the space within the plunger by removing the manhole 45 in head cover and that in the plunger, since it will be possible for a man to pass down between the runner vanes while the runner is in place. By this means the inlet valve 24, below the plunger can be adjusted to the proper position, and this valve will not require further adjustment during ordinary operation of the plant.

In the turbine shown in Fig. 1 the runner 8 is positioned just beyond the throat $W^2$ of the passage W and discharges into the spreading draft tube D. In order to secure a runner of very high specific speed and good efficiency, the vane surface as shown in Fig. 5 is made small in order to reduce the so-called surface friction, or the loss due to the high relative velocity between the vanes and the water. For this purpose a small number of narrow vanes 16 are used, and the vanes are widely spaced and not connected by any outer band or shroud, and are given a shape somewhat similar to that of the blades of a marine propeller; with the difference, however, that the blades 16 do not extend in radial lines normal to the axis, but extend in lines oblique to the axis, the hub $h$ being conical as shown in the drawings. A runner of this diagonal form may be designed to give high efficiency and high specific speed and, in the combination of this invention, such a runner is particularly advantageous not only in permitting the use of a plunger gate 20 on the entrance side to regulate the flow but also in providing a compact arrangement in which the runner contour conforms to the desired conical shape of the plunger when the latter is closed.

The diagonal outward flow of the runner also permits the runner to discharge directly into a diagonal annular draft tube and allows the runner to be supported by a steady-bearing 14 contained within the central cone of the draft tube immediately adjacent to the runner. The throat area of the water passage is not reduced by space for a bearing but is left clear by the overhung arrangement of runner.

The discharge of such a diagonal runner is also in a diagonal direction instead of vertically upward and this is important in an inverted turbine such as is shown in Fig. 1, because of the limitations imposed by the draft tube conditions. In a turbine having a runner of high specific speed with high velocities of flow it is particularly important to maintain a proper relation between the velocity head and pressure head and elevation such that the pressure at no point will drop so low as to break the continuity of the water column, in accordance with the following formula:

$$(1-\zeta)\frac{v^2}{2g}+h_p-z=h_{at}$$

in which—

$\zeta$ denotes the percentage of velocity head lost in the draft tube and at final discharge from the draft tube.

$v$ denotes the absolute velocity of discharge at the point considered.

$g$ denotes the acceleration of gravity.

$h_p$ denotes the absolute pressure head at the point considered.

$z$ denotes the height of the tail-water above the point considered.

$h_{at}$ denotes the pressure head corresponding to atmosphere.

In a downwardly discharging turbine, if there is a proper margin in pressure at the runner discharge in accordance with the formula just mentioned so that there is no danger of a breaking of the water column at this point, there will be no danger of a break occurring in the column at any other point, since the velocity is continually decreasing and the elevation is also decreasing at every successive point from the runner to the final outlet. In an inverted turbine, however, it is not sufficient to know that the above formula is satisfied at the runner discharge—it must also be satisfied at every point in the tube. If the elevation of successive sections increases faster than the velocity head decreases, the margin of pressure may soon disappear and conditions endangering or requiring discontinuity of the water column be caused. It may thus happen that although there is a safe margin of absolute pressure at the runner discharge, there may be no such margin at some other point in the tube.

If the conditions at the runner discharge are such that the velocity-head is decreasing faster than the linear distance traversed in the direction of flow, the tube cannot start in a vertically upward direction, but must begin in an inclined direction. This can readily be secured by a draft tube of the spreading type into which the runner discharges in a direction inclined toward the vertical—necessarily in a diagonal outward-flow direction. The angle of discharge with respect to the vertical (the turbine axis) must be sufficient to keep the rate of increase in elevation of successive points equal to, or less than, the corresponding rate of decrease of velocity head. This angle depends not only on the rate of reduction of the meridian component of velocity, but also on the rate of reduction of the whirl component. In a draft tube of the spreading type an increase in the angle of the discharge with respect to the axis will not only decrease the rate of change of elevation, but will at the same time increase the rate of reduction of whirl, since it will increase the rate of enlargement of the radius, and the whirl is inversely proportional to the radius.

The above considerations become more important in the case of turbines of very large size. When the diagonal outward flow type of runner is used, discharging directly into a spreading draft tube, proper conditions can be obtained without difficulty at all points in the draft tube even in turbines of much larger dimensions than any now in existence, and all danger of breaking of the water-column can be readily avoided.

The turbine of this invention is notable for its mechanical simplicity. By arranging the plunger gate below and the runner above, the plunger is not required to surround the shaft, and is entirely clear of the shaft and runner. It also becomes possible in this arrangement to place the runner close to the bearing, and to support the bearing rigidly. The outward flow form of runner permits it to be removed from above by removing the head cover without disturbing the plunger gate or any portion of the surrounding casing. In fact, it will be possible when desired to close the plunger gate and remove the runner without closing the head gate.

In the turbine shown in Fig. 1, the runner 8 is positioned at a considerable distance below tail-water level L, adding to the initial head on the runner and making it possible to employ increased velocities of flow therethrough. The runner abstracts only a part of the whirl from the stream, which therefore enters the diagonal annular draft tube D, in an upwardly expanding cone whirling about its axis on expanding spiral lines. The cross section of the draft tube gradually increases to decelerate the velocity of the discharge and regain its velocity head as pressure head and the flow is received from the draft tube by the outlet 6 encircling the annular draft tube and finally leading the discharge to the tail-water. In this construction the outer annular draft tube wall extends upward above the highest tail-water level so that it forms a crest C, above the tail-water level and over this crest the draft tube D, and outlet 6 form a siphon. By closing the head gates or the plunger gate 20, and pumping the water out of the passages the turbine parts will thus be made accessible without extra outlet gates as the tail-water will not rise over the crest C.

In the modified embodiment of the invention illustrated in Fig. 2, a special form of construction is shown which may be advantageous in certain cases particularly for turbines of moderate or small size. In this embodiment of the invention, the runner 8' is of such vertical height that it can be removed and replaced through the intake space of the turbine. For this purpose some of the intake guide vanes 81 may be made removable as shown at 17—18 Fig. 2 so that when taken out they would leave sufficient space for the runner to pass. In particular installations it is proposed to obtain the desired direction and velocity of the entrance flow by suitable design of the volute casing with the aid of a very small number of guide vanes. By this method it will be possible to reduce the number of guide vanes to three or four and the runner in such an arrangement would be removed without disturbing any other portion of the structure.

This Fig. 2 modification is more compact in the arrangement of the water passages and of less vertical height than the Fig. 1 form and can be used where it is not necessary to position the runner at such a low elevation. In this Fig. 2 form, the power house substructure contains the intake passage 75 and discharge passage 76 connected by the curved conduit 77 within which is the turbine runner 8'. A shaft 79 supports the runner 8' and drives the power generator 80 supported on the substructure foundation. The intake and discharge are provided with vane rings 81 and 82, respectively, preferably vertically one above the other and forming with the foundation a continuous support resting on the bottom of the intake 75 and sustaining the power house structure above. The runner 8' has a cover casting 83 resting on vane ring 82 and carrying a central bearing for the shaft 79.

The flow entering by intake 75 passes upwardly through conduit 77 and the blades of runner 8' and out through the discharge passage 76. To control the flow a gate 20' in form of a plunger is provided below the runner and is moved by means different from those of the plunger gate 20 of Fig. 1. The gate 20' has a piston guided and moving in a pit 91, and the top, 92, of the plunger gate is supported on this piston portion 93, working in the annular space between rings 94 and 95 so as to form a space 96 for pressure lifting or closing the gate. Suitable pipes 35' and 36' controlled by valve means on the power house floor above are provided for supplying fluid pressure to operate the plunger and the plunger is connected to control means 100 in the power plant by restoring rods and levers 101, 102, 103 and 104, located in the passage in the substructure; or restoring connections can be used in which a rod passes through hollow or recessed vanes in the vane rings 81 and 82, in an arrangement similar to that shown in Fig. 1.

In the modified installation illustrated in Figs. 3 and 4 the turbine is shown in horizontal position with intake passage 125 and discharge passage 126 connected by the water passage W' and draft tube D'. The runner 8' has a horizontal shaft 9' and its hub forms the apex of a conical projection from the power house wall 121. The plunger housing 129 and the stay vane rings 127 and 128 at entrance and discharge form a continuous structure tying together the walls of the water passages 125 and 126 and rigidly holding the parts of the turbine in alignment. The plunger 120 may be controlled by pressure means as in Fig. 1. Access to the piston end of the plunger housing is provided by the pit or space 150 and the back plate 157 of the housing 129 is removable, permitting the plunger 120 to be removed for replacement or repairs without disturbing other parts of the turbine. The runner can be removed either into the generator room at the left by first removing the shaft bearing and headcover, or it can be removed into the space 150 by first withdrawing the cover 157 and plunger 120.

In Fig. 3, the horizontal shaft design is shown as adapted for a closed concrete spiral casing and in the arrangement shown the shaft 9' might advantageously run parallel to the dam so that the flow would directly enter the contracting volute intake passage 125 and pass as a whirling vortex through the turbine passages W' and out through the spreading draft tube D' to the outlet 126. In this way the flow would be gradually accelerated along smooth lines and turned onto the runner as a solid whirling stream with a horizontal axis and then gradually decelerated on expanding spirals in the draft tube and outlet to the tail-water.

In Fig. 4 the intake for the horizontal installation is shown adapted for an open flume setting. In this arrangement the draft tube D' is contained in the end wall of the flume 145 and the entering water flows in the flume in a direction parallel to the turbine shaft 9' and is turned and given a whirl through entrance guide vanes 12"', which also serve, together with the column support 25', to sustain the plunger gate 120' and its housing.

The arrangement of Fig. 4 is particularly adapted to installations under low heads where it is important to keep the first cost of the installation low. In this arrangement the turbine may in many cases be placed within the end wall of the flume which forms a dam; and the turbine shafts will be perpendicular to the dam.

It will be noted from the figures that the runner of this invention is so formed that the wall of the central cone forming the runner hub diverges at a greater angle from the turbine axis than does the wall of the outer water passage at the point where it meets the tips of the runner vanes. It will be further noted that the transverse width of the water passage between the outer and inner wall of the draft tube diminishes in the entrance portion of the draft tube adjacent to the runner discharge. This structure is provided to avoid a too rapid reduction in the meridian velocity of flow, that is, in the component of the velocity of flow measured in a plane containing the turbine axis. If the draft tube passage at the point where it receives the high velocity discharge from the runner should be given constant transverse width, this passage in receding from the axis would increase in area at too rapid a rate. In accordance with this invention, the meridian component of velocity should be constant or nearly constant during the passage of the water through the runner, and after discharge from the runner this velocity should decrease at a sufficiently gradual rate to permit the velocity head to be efficiently converted into useful pressure head. It is, therefore, proposed to give the two walls of the passage converging directions with respect to each other at the runner and at the entrance end of the draft tube, these walls being subsequently curved to decrease this relative convergence as the discharge end of the annular draft tube is approached; in fact, under suitable conditions, in the portion of the draft tube near its discharge end, the walls can be given parallel directions when viewed in a cross-section containing the axis, or can even diverge from each other.

The runner and water passage of this invention are so formed that the flow near the hub $h$ will be decidedly outward in direction, that is diagonally away from the shaft as indicated by the inner arrow, while the flow at the outer tips of the vanes will have a very small outward component, the meridian component of this flow being nearly axial as shown by the outer arrow. By this design the tips $t$ of runner vanes are placed at or near the throat $W^2$ of the water passage having minimum diameter, thus enabling the diameter of the runner 8 to be kept small. By arranging the vanes 16 to extend diagonally from the hub $h$ to the tips $t$, the innermost portion of the blades is kept at a reasonable radial distance from the shaft and the velocity of the vane at this point maintained at a suitable value.

I claim:—

1. In a hydraulic turbine structure the combination of an inwardly directed intake passage leading to an axially upward flow passage, a diagonally outward flow passage continuing from said axial flow portion, a turbine runner having diagonal outward flow blades in said outflow passage, and an annular draft tube receiving the discharge from said runner.

2. In a hydraulic turbine structure the combination with an intake passage, of a plunger gate for regulating the flow therethrough, and a runner in the flow through said turbine structure having unshrouded blades receiving and discharging the flow in a diagonally outward direction.

3. In a hydraulic turbine structure the combination of inward and upward flow guiding means, a runner of diagonal outward-flow type, and a vane-free transition space between said guiding means and said runner.

4. A hydraulic turbine structure comprising a water passage bounded by inner and outer surfaces of revolution, coaxial with the turbine and formed to guide the flow inwardly, then axially upwardly and then outwardly with respect to the turbine axis, guiding means in the inward flow portion to direct the water in a whirling motion about said axis, and a runner in said passage between the points of axial and outward flow.

5. In a hydraulic turbine structure the combination of an intake passage, a turbine runner above said intake passage and receiving the flow therefrom, and a vertically movable gate controlling the flow through said runner.

6. In a hydraulic turbine structure the combination of an intake passage, a turbine runner above said intake passage and receiving the flow therefrom, and a gate sliding vertically in said intake to control the flow to said runner.

7. In a hydraulic turbine structure the combination of an intake passage, a turbine runner above said intake passage and receiving the flow therefrom, a pit below said runner, and a plunger gate movable in said pit and capable of projecting therefrom to control the flow through said turbine.

8. In a hydraulic turbine structure the combination of an intake passage, a turbine runner above said intake passage and receiving the flow therefrom, a pit below said runner, a plunger gate movable in said pit and capable of projecting therefrom to control the flow through said turbine, and fluid pressure means for moving said gate.

9. In a hydraulic turbine structure the combination of an intake passage, a turbine runner above said intake passage and receiving the flow therefrom, a pit below said runner, a plunger gate movable in said pit and capable of projecting therefrom to control the flow through said turbine, controlling means for said plunger, and a mechanical connection between said gate and said controlling means.

10. In a hydraulic turbine structure the combination with an intake passage having a vane ring, of a plunger gate having guiding means below said ring and moving upwardly within said ring to regulate the flow through said turbine.

11. In a hydraulic turbine structure the combination with an intake of a turbine runner above said intake, a plunger gate controlling the flow through said turbine, and guiding means for said gate comprising a vane ring in said intake.

12. In a hydraulic turbine structure the combination with an intake passage and a discharge passage above said intake passage, of a conduit connecting said passages, a runner in said conduit, and a plunger gate movable between said intake and said runner.

13. In a hydraulic turbine structure the combination with an intake having a stay vane ring, of a turbine runner receiving water from said intake and removable through said stay vane ring.

14. In a hydraulic turbine structure the combination with an intake having a stay vane ring, of a runner above said intake and removable through said stay vane ring.

15. In a hydraulic turbine structure supporting means comprising cylindrical gate guiding means in the substructure foundation and vane rings continuing upward from said guiding means.

16. In a hydraulic turbine structure the combination with a speed ring having one or more of its vanes removable, of turbine runner adapted to pass through the space left by the removal of said vanes.

17. In a hydraulic turbine structure the combination with an intake passage, and a discharge passage above said intake passage, of a conduit connecting said passages, a runner in said conduit, and a plunger gate movable between said intake passage and said runner and having a diameter greater than the least diameter of said conduit.

18. In a hydraulic turbine structure an outward diagonal flow runner, the water passage for the flow through said runner having an outer surface of revolution guiding the meridian components of flow more nearly axial in the outermost portions of said runner, and an inner surface of revolution guiding the portions of the flow nearer the axis in a more outward and less axial direction.

19. A hydraulic turbine structure comprising a water passage bounded by two surfaces of revolution coaxial with the turbine formed to guide the flow inwardly, then axially and then outwardly with respect to the turbine axis; guiding means in the inward flow portion to direct the water in a whirling motion about said axis; and a diagonal outward flow runner in said passage having its blade tips in close proximity to the section of least diameter of said passage.

20. A draft tube for a hydraulic turbine symmetrical about the turbine axis and comprising an annular water passage contained between two surfaces of revolution extending from the runner, both of said surfaces at the entrance end of the draft tube having a direction diagonally outward with respect to said axis, and said passage continually receding from the axis from its entrance to its discharge end and having a relatively straight portion for a substantial distance from the runner.

21. In a hydraulic turbine structure the combination with a runner having a hub provided with a substantially straight conical surface enlarging in the direction of flow, of a draft tube passage contained between two walls formed as surfaces of revolution coaxial with the runner, the inner wall having at its junction with the runner hub a direction diagonal to the axis to guide the flow outward from the axis.

22. A hydraulic turbine structure having a runner discharging diagonally outward, and a draft tube therefor bounded by two surfaces of revolution, said surfaces receding from the turbine axis in diagonal directions at all points, and the inner surface being everywhere spaced away from the axis, the passage formed between said surfaces being relatively narrow and flaring outwardly along substantially straight lines.

23. In a hydraulic turbine structure having a runner discharging diagonally outward, a draft tube contained between two conical surfaces of revolution, the inner surface at the entrance end of said tube receding from the axis at a greater angle of obliquity thereto than the outer surface.

24. In a hydraulic turbine structure the combination with an intake passage, of a plunger gate movable in said passage to control the flow therethrough, a runner driven by the flow from said intake, and a shaft entirely outside of said gate and supporting said runner.

25. In a hydraulic turbine structure the combination with a water passage, of a diagonal outward flow runner driven by the flow through said passage, and a plunger gate controlling said flow.

26. In a hydraulic turbine the combination with a runner having a hub enlarging in the direction of flow, of a draft tube for the hydraulic turbine symmetrical about the turbine axis and comprising an annular water passage contained between two walls formed as surfaces of revolution, one of which is substantially straight for a substantial distance after leaving the runner, said passage at its entrance end having a direction diagonally outward with respect to said axis, and said passage continually receding from the axis from its entrance to its discharge end.

27. A hydraulic turbine structure having a runner discharging diagonally outward in an upward direction, and a draft tube therefor bounded by two walls formed as surfaces of revolution, said walls receding from the turbine axis in diagonal directions at all points, and the inner wall being everywhere spaced away from the axis.

28. In a hydraulic turbine structure having a runner discharging diagonally outward, a draft tube contained between two walls formed as surfaces of revolution, the inner wall at the entrance end of said tube receding from the axis at a greater angle of obliquity thereto than the outer wall.

29. In a hydraulic turbine structure a runner on the end of a shaft which projects from the runner on its discharge side, and a plunger gate in the water passage on the intake side of said runner movable axially toward or away from said runner to regulate the flow through the turbine.

30. In a hydraulic turbine structure a plunger gate in the intake passage to the runner, said runner being mounted on a shaft on the opposite side of said plunger.

31. In a turbine structure the combination with a runner having its discharge directed upward, of a draft tube passage formed by inner and outer surfaces of revolution receiving the flow from said runner and inclined at such an angle to the vertical that the elevation of successive sections of the passage increases at less rate than the velocity head decreases.

32. In a hydraulic turbine the combination with a runner having radial inflow guide means, of a transition space turning the flow toward the axial direction and having its lower surface movable to control the flow through the turbine.

33. In a hydraulic machine, a rotor comprising vanes formed to freely discharge the liquid radially of the rotor axis, means for positively producing a whirling vortex of liquid and for delivering said vortex upwardly toward said rotor, and means providing an annular flaring flow decelerating conduit above said rotor for receiving the discharge therefrom.

34. In a hydraulic machine, a rotor, means for positively producing a vortex of liquid and for delivering said vortex upwardly toward and outwardly through said rotor, and means providing a flow decelerating conduit above said rotor for receiving the discharge therefrom.

35. In a hydraulic machine, a rotor, a continuous wall forming a conduit extending above and below the lower portion of and surrounding said rotor whereby fluid flows to said rotor along axially progressing lines, and means forming a liquid sealed chamber extending above and below the upper end of said wall.

36. In a high specific speed hydraulic machine having a propeller runner, a continuous wall forming a conduit extending above and below the lower portion of and surrounding said runner whereby fluid flows thereto along substantially axially progressing lines, means forming a liquid sealed chamber above said wall, and a liquid basin communicating with said chamber only below the top of said wall.

37. In a high specific speed hydraulic machine having a propeller type rotor with an axis of rotation, a wall extending entirely around said axis above the lower portion of said rotor, said wall forming a conduit communicating with said rotor whereby fluid flows to said rotor along substantially axially progressing lines, and means forming a liquid sealed chamber located above said wall and extending below the exterior thereof.

38. In a hydraulic machine having a propeller type rotor disposed on a vertical axis of rotation, a wall completely surrounding said axis and forming a conduit communicating with the bottom and top of said rotor, means forming a sealed chamber extending laterally from said axis and beyond said wall, and a liquid basin communicating with said chamber at the exterior and below the top of said wall.

39. In a hydraulic machine having a propeller type rotor disposed on a vertical axis of rotation, an annular wall completely surrounding said axis and extending upwardly from below the lower portion of said rotor whereby fluid flows thereto along substantialy axially progressing lines, said wall forming a conduit communicating with the top of said rotor, means forming a sealed conduit directed toward the axis of said rotor above the top of said wall, and a liquid basin communicating with said sealed conduit below the top of the exterior of said wall.

40. In a hydraulic machine having a propeller type rotor with a vertical axis of rotation, an annular wall completely surrounding said axis and extending upwardly from below the lower portion of said rotor, said wall forming a conduit directed along the axis of said rotor from above and below the same whereby fluid flows thereto along substantially axially progressing lines, means forming a sealed annular conduit directed toward the axis of said rotor and extending downwardly beyond the periphery of said wall, and a liquid basin communicating with said downwardly extending conduit portion below the top of said wall.

41. In a high specific speed hydraulic machine, a rotor having a vertical axis of rotation, and means forming an open vertical flow decelerating conduit extending above and below said rotor which is located therein whereby fluid flows to said rotor along substantially axially progressing lines, the upper end of said conduit communicating with a liquid basin and the wall of said conduit forming a continuous crest extending above the level of the liquid in said basin to permit drainage of liquid from said conduit without permitting flow of liquid from said basin into said conduit.

42. In a high specific speed hydraulic machine having a propeller type rotor disposed on a vertical axis of rotation, means forming an open vertical flow decelerating conduit within which said rotor is located whereby fluid flows to said runner along substantially axially progressing lines, and means forming a liquid basin in which the liquid level is maintained below the top opening of said conduit.

43. In a hydraulic machine, a rotor having a vertical axis of rotation, and means forming a conduit surrounding said axis above and below said rotor whereby fluid flows thereto along substantially axially progressing lines, said conduit being formed to decelerate liquid delivered from said rotor, and a liquid basin below the upper extremity of said conduit but communicable with said conduit extremity by siphon action during operation of said rotor.

44. In a high specific speed hydraulic machine, a rotor having a vertical axis of rotation, means forming a conduit which directs flow to said rotor along substantially axially progressing lines, means forming a liquid basin surrounding said axis above said rotor, and means forming a flow decelerating conduit extending entirely above the level of the liquid in said basin and adapted to gradually decelerate the liquid delivered from said rotor.

45. In a high specific speed hydraulic machine, a propeller type rotor to which fluid flows along substantially axially progressing lines, a trumpet shaped casing forming a flow decelerating conduit communicating with said rotor, and a liquid basin through which said casing extends, said casing forming an annular continuous crest extending above the level of the liquid in said basin.

46. The combination in a hydraulic turbine, comprising a passage having an intake portion extending inwardly and then turning axially and a discharge portion extending outwardly, a runner disposed in said passage so as to receive fluid flowing in an upward direction, said intake and discharge portions being so disposed that a straight line can be drawn through the inwardly extending part of said intake and past the runner into the discharge, and guide vanes in said intake passage disposed below a horizontal plane containing the lowermost portion of said runner.

HARVEY BIRCHARD TAYLOR.